United States Patent [19]
Suzuki

[11] 3,802,296
[45] Apr. 9, 1974

[54] REDUCTION GEAR MECHANISM
[75] Inventor: Masaru Suzuki, Aichi, Japan
[73] Assignee: Kabushiki-Kaisha Tokai-Rika-Denki-Seisakusho, Aichi-Pref., Japan
[22] Filed: Dec. 7, 1972
[21] Appl. No.: 313,058

[30] Foreign Application Priority Data
Dec. 15, 1971 Japan.............................. 46-101635

[52] U.S. Cl. ................................................ 74/797
[51] Int. Cl............................................... F16h 1/28
[58] Field of Search ............ 74/797, 801, 803, 804, 74/805, 793

[56] References Cited
UNITED STATES PATENTS
| | | | |
|---|---|---|---|
| 1,187,669 | 6/1916 | Spaulding............................ | 74/797 |
| 1,417,300 | 5/1922 | Couch.................................. | 74/803 |
| 2,908,191 | 10/1959 | Sundt................................... | 74/797 |
| 3,106,997 | 10/1963 | White................................... | 74/797 |
| 3,190,149 | 6/1965 | Gorfin.................................. | 74/805 |

FOREIGN PATENTS OR APPLICATIONS
1,199,257    7/1970    Great Britain........................ 74/797

*Primary Examiner*—Benjamin W. Wyche
*Assistant Examiner*—Wesley S. Ratliff, Jr.
*Attorney, Agent, or Firm*—George Vande Sande

[57] ABSTRACT

A reduction gear mechanism for making a very high reduction ratio of rotating speed between an input shaft and an output shaft by a few gear wheels. In an outer cylinder having a number of internal teeth is located an inner cylinder having a number of openings which is less by one or a few than the number of said internal teeth, and a planet sprocket wheel which is fixed to an input shaft engages said internal teeth and said openings. One of said cylinders is fixed to an output shaft and the other is fixed to a suitable stationary frame.

8 Claims, 3 Drawing Figures 3,802,296

REDUCTION GEAR MECHANISM

DETAILED DESCRIPTION OF INVENTION

Figure 1:
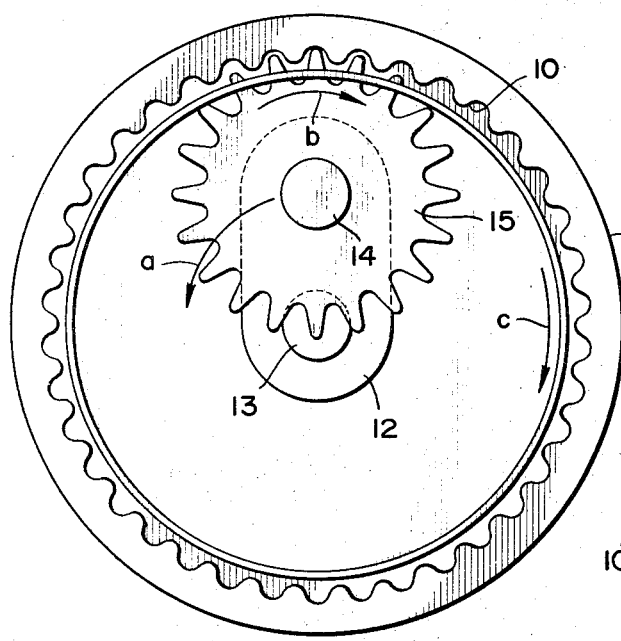

This invention relates generally to a reduction gear mechanism, and more particularly to a differential reduction gear mechanism which can make a large reduction ratio of rotating speed between an input shaft and an output shaft by a few gear wheels.

In some of measuring instruments, e.g. a time indicator of which indicating means or hands rotate very slowly, it is often necessary to make an uncommonly large reduction ratio of rotating speed between an input shaft and an output shaft. For performing it, if a normal gear train is used, a great number of gear wheels, shafts and other parts associated therewith is necessary. It is difficult and complex to fabricate those parts with high precisions and precisely dispose them to assemble a complete gear train.

So called Furgasson's differential gear mechanism is well known as one of reduction gear mechanism which can decrease highly a rotating speed with a little number of gear wheel.

Furgasson's differential gear mechanism comprises an input shaft disposed coaxially with the center axis of the mechanism, an output shaft disposed coaxially with said center axis, a first sun gear wheel having a number of teeth formed on the outer periphery thereof and being coaxially with said center axis and fixed rigidly to a suitable stationary part such as a frame, a second sun gear wheel having a number of teeth formed on the outer periphery thereof and being coaxially with said center axis and mounted on said output shaft, said first and second sun gear wheels having same outer diameters while the number of teeth of said first sun gear wheel being more or less by one tooth or a few than the number of teeth of said second sun gear wheel, and a planet gear being pivotably mounted on an arm which is fixed rigidly to said input shaft, so that said planet gear may engage with and revolute along the both toothed peripheries of said first and second sun gear wheels.

With this structure of the Furgasson's differential gear mechanism, assuming that the number of teeth of the first sun gear wheel be of Z+1 and the number of teeth of the second sun gear wheel be of Z, a rotating speed of the input shaft is dropped down by the ratio of $[(Z+1)-Z]/Z$, i.e. $1/Z$, in the reduction gear mechanism and, therefore, the output shaft is driven with a rotating speed of the input shaft by the ratio. Accordingly, when the difference between the number of teeth of the first sun gear wheel and the number of teeth of the second sun gear wheel is small and the numbers of teeth of both wheels are great, a very high reduction ration will be obtained.

The advantages and features of the Furgasson's differential gear mechanism are that it can reduce a rotating speed in a large extent without using many gear wheel and parts associated therewith and its construction is relatively simple.

As aforementioned, the Furgasson's reduction gear mechanism comprises two sun gear wheels which have same outer diameters and different numbers of teeth by one tooth or a few to each other, so that either or both of those wheels must be profile shifted gear or shifted gear. It is more difficult to produce a shifted gear than in a normal gear. Furthermore, the Furgasson's mechanism shall be of a relatively large size because the planet gear is disposed at the outside of the sun gear wheels.

This invention removes the disadvantages in such a conventional differential reduction gear mechanism.

Accordingly, it is a principal object of this invention to provide a reduction gear mechanism comprising an input shaft coaxial with the center axis of the mechanism, an output shaft coaxial with said center axis, an outer cylinder having a number of internal teeth formed on the inner surface thereof and being coaxial with said center axis, an inner cylinder having a number of openings formed on the periphery thereof and being located coaxially within said outer cylinder so that the periphery of said inner cylinder may be adjacent to the inner tips of said internal teeth with a very small clearance therebetween, the pitches of said openings being almost same or a little smaller than the pitches of said internal teeth and the number of said openings being less by one or a few than the number of said internal teeth, either of said cylinders being fixed to a suitable stationary frame of an apparatus and another being fixed to said output shaft, and a planet sprocket wheel having a number of teeth which engage with both said openings and said internal teeth and being pivotably mounted on an arm which is fixed to said input shaft.

In the mechanism of this invention, the planet wheel is disposed inside the two cylinders so that its overall size may be smaller than the conventional Furgasson's mechanism.

It is another object of the present invention to provide a reduction gear mechanism which is compact and simple in structure.

As will be seen from aforementioned, this invention provides a differential reduction gear mechanism which is of compact and simple structure. According to the present invention, it is able to make a great reduction gear ratio between the input shaft and the output shaft of the mechanism.

Figure 2:
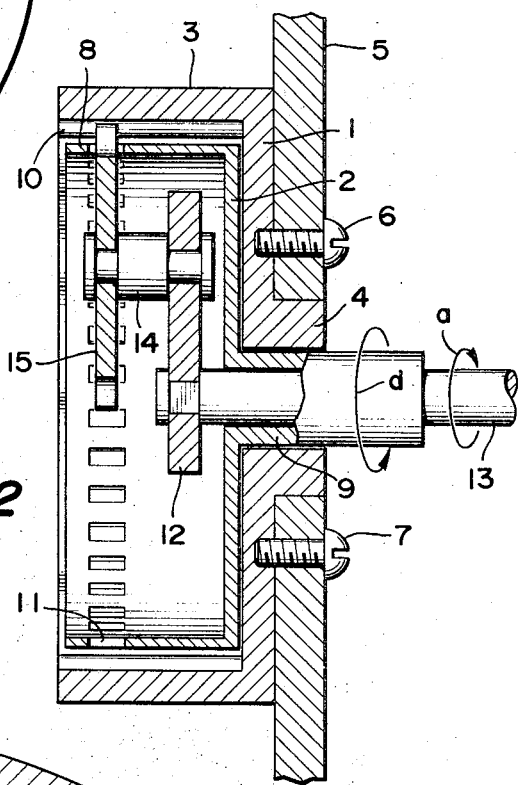
Figure 3:
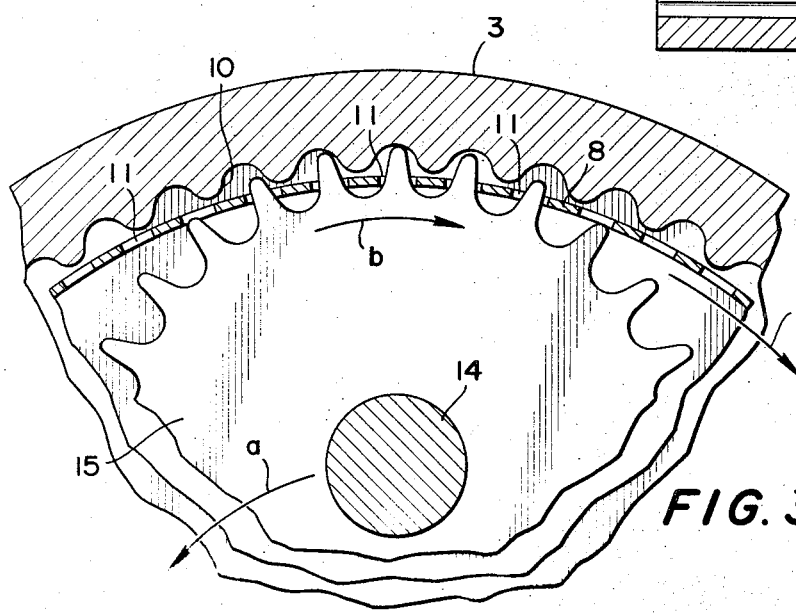

The present invention will be more clearly understood from the following description which refers to accompanying drawings wherein:

FIG. 1 shows a front view of a reduction gear mechanism according to the invention, FIG. 2 shows a sectional side view of the reduction gear mechanism, and FIG. 3 shows a fragmentary enlarged front view of the reduction gear mechanism.

As seen in the drawings, a reduction gear mechanism according to the present invention comprises an outer cylindrical means 1 and an inner cylindrical means 2. The outer cylindrical means 1 has a cylindrical portion 3 and is provided with a tubular portion 4 formed coaxially with the axis of the apparatus and extended from the side wall of said outer cylindrical means 1. The outer cylindrical means 1 is fixed to a suitable stationary frame 5 of an apparatus by screw studs 6 and 7 at the side wall thereof. The inner cylindrical means 2 has a cylindrical portion 8 and a tubular portion 9 which is extended from the side wall of said inner cylindrical means 2. The tubular portion 9 serving as an output shaft is coaxial with the tubular portion 4 of said outer cylindrical means and projects through said tubular portion 4 so as to slidably rotate in relation to said tubular portion 4. The cylindrical portion 3 of the fixed cylindrical means 1 has a number of internal teeth 5 formed on the inner surface thereof. The outer diameter of the cylindrical portion 8 of the inner cylindrical means 2 is slightly smaller than the diameter of a circle line inscribed to the tips of the inner teeth 10 of said outer cylindrical means 1, so that when the cylindrical portion 8 of said inner cylindrical means 2 is inserted within the cylindrical portion of said outer cylindrical means 1, the cylindrical portion 8 may be positioned near to the inner teeth 10 with a very small clearance therebetween. As shown in FIG. 3, in the cylindrical portion 8 of the inner cylinder 2 is formed a number of openings 11 of which circular pitches are substantially same or little smaller than the pitches of the internal teeth 10, and of which number is less by one or a few than the number of the internal teeth 10. The openings may be perforations, slots or notches. In the embodiment shown, the openings are perforations.

An arm 12 is fixed to the inner end of an input shaft 13 which extends outward through the tubular portion 9 serving as the output shaft and is rotatable relatively to said tubular portion 9.

A sprocket wheel 15 is pivotably mounted on a stub shaft 14 which is its self pivotably mounted at the opposite end to the end having said input shaft 13 on the arm 12. The teeth of the sprocket wheel 15 engage with both the internal teeth 10 of the outer cylinder 1 and the perforations 11 of the inner cylinder 2.

In the above described embodiment, when the input shaft 13 rotates in the direction of arrow $a$, the sprocket wheel 15 revolutes along the periphery of the inner cylinder 2 about the center axis of the mechanism in the direction of arrow $a$ and simultaneously rotates on the stub shaft 14 in the direction of arrow $b$ by the engagement of the teeth of the sprocket wheel 15 with the internal teeth 10 of the outer cylinder 1. Because the teeth of the sprocket wheel 15 also engage with the perforations 11 of the inner cylinder 2 and the number of the perforations 11 is less by one or a few than the number of the internal teeth 10 of the outer cylinder 1, the revolution of the sprocket wheel 15 about the center axis of the mechanism makes the inner cylinder 2 rotate in the direction of arrow $c$ relative to the fixed outer cylinder 1 by one or a few pitches of the perforations, the number of the pitches corresponding to the difference between the number of the internal teeth 10 of said outer cylinder 1 and the number of the perforations 11 of said inner cylinder 2. As a result, a differential movement of a ratio of "the number of the internal teeth 10 — the number of the perforations 11: the number of the internal teeth 10" is established between the input shaft 13 and the output shaft 9, and thereby, the rotating speed of the input shaft 13 is reduced by the differential ratio in the mechanism and the output shaft 9 rotates with the reduced speed in the opposite direction to the rotating direction of the input shaft 13 shown by the arrow $d$ in the FIG. 2.

As a modified embodiment, the inner cylinder means 2 may be fixed to the frame 5 of the apparatus and the outer cylinder means 1 may be connected to the output shaft 9. In this case, the outer cylinder 1 and the output shaft 9 fixed thereto rotate in the same direction as the input shaft 13 with a greatly reduced rotating speed.

It is to be understood that this invention is not limited to the details herein set forth or the details illustrated in the drawings, but is of the full scorp of the appended claim.

I claim:

1. A reduction gear mechanism characterized by comprising an outer cylinder means having a number of internal teeth provided on the inner peripheral surface of the cylindrical portion thereof, an inner cylinder means having a number of openings formed on the cylindrical portion thereof, an input shaft coaxial with the center axis of the mechanism, an output shaft fixedly connected to said inner cylinder means coaxially with said input shaft, the pitch of said openings being slightly smaller than the pitch of said internal teeth to make slightly less the number of openings than the number of teeth of said internal teeth, an arm fixed to said input shaft and a planet sprocket wheel pivotably mounted on said arm and engaged with both of said internal teeth and said openings, and one of said cylinder means being fixed to a suitable stationary portion.

2. A reduction gear mechanism according to claim 1, wherein the outer cylinder means is fixed to the stationary portion of an apparatus applied with the mechanism, the output shaft projects outward through the tubular portion of said outer cylinder means, said tubular portion being employed as an output shaft.

3. A reduction gear mechanism according to claim 1, wherein the input shaft is extended inwards through said tubular portion and the arm is fixed to the inner end of said input shaft at the end portion opposite to the end portion on which the sprocket wheel is pivotally mounted.

4. A reduction gear mechanism according to claim 1, wherein the inner cylinder is inserted into the outer cylinder with both of the peripheral portions being positioned closely to each other.

5. A reduction gear mechanism according to claim 1, wherein each tip of the teeth of the sprocket wheel is engaged with the teeth of the outer cylinder through the openings of the inner cylinder.

6. A reduction gear mechanism according to claim 1, wherein the inner cylinder means is fixed to the stationary portion such as a frame, the outer cylinder means is connected to the output shaft.

7. A reduction gear mechanism according to claim 1, wherein said openings of the inner cylinder are perforations.

8. A reduction gear mechanism according to claim 1, wherein said openings of the inner cylinder are notches.

* * * * *